May 30, 1961 W. L. DAUBNER 2,985,934
SADDLE CLAMP
Filed April 22, 1959 2 Sheets-Sheet 1
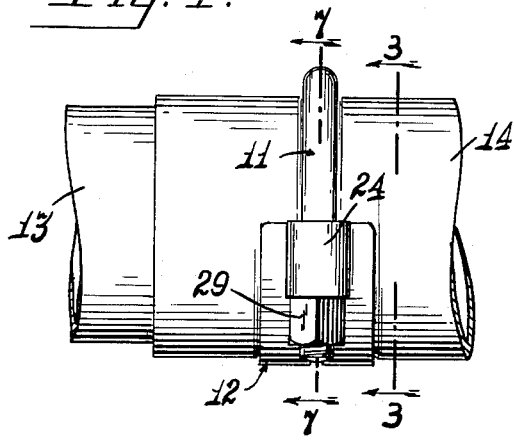
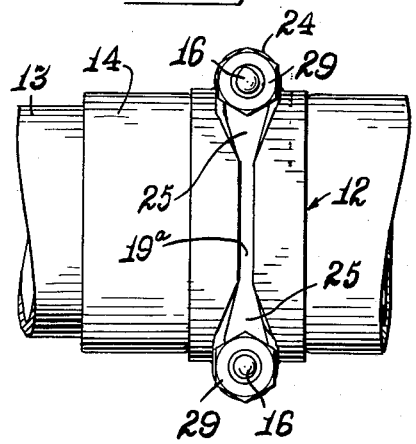
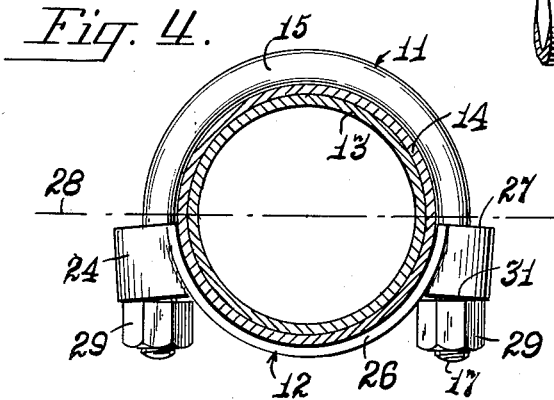
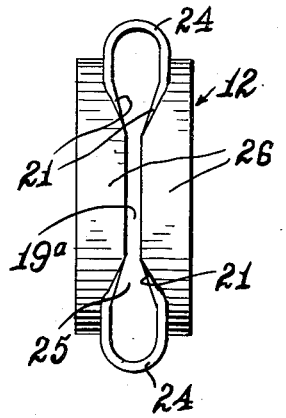
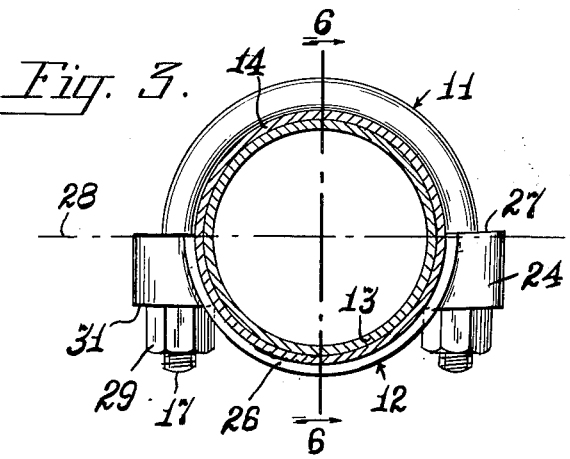
INVENTOR.
William L. Daubner
BY
Elmer L. Quickel
Atty.

May 30, 1961     W. L. DAUBNER     2,985,934
SADDLE CLAMP
Filed April 22, 1959          2 Sheets-Sheet 2
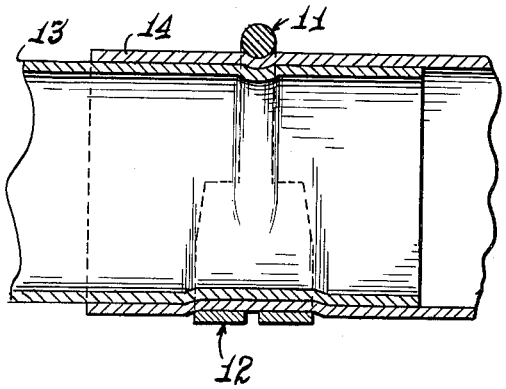
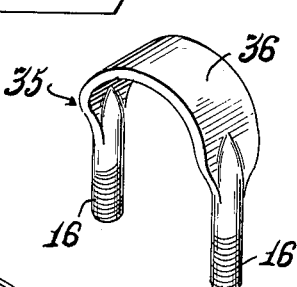
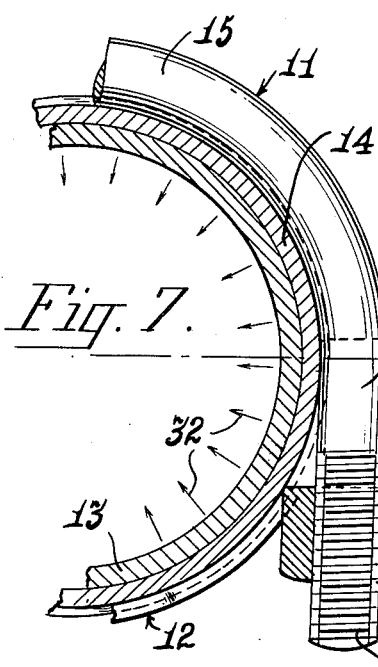
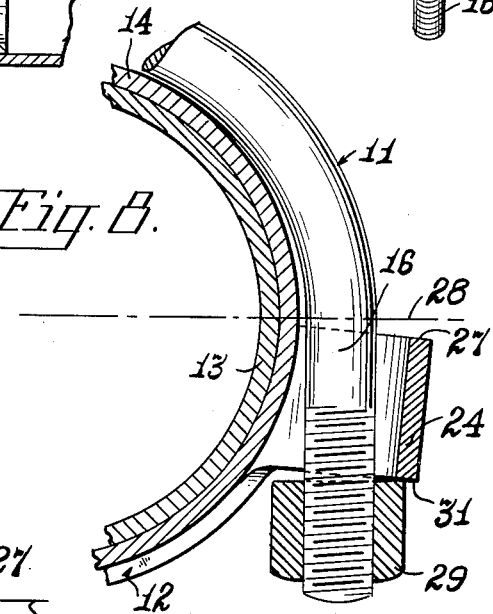
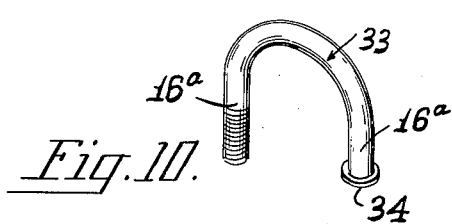
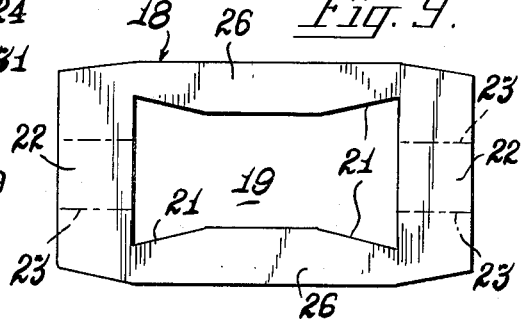
INVENTOR.
William L. Daubner
BY
Elmer L. Quickel
Atty.

United States Patent Office 2,985,934
Patented May 30, 1961

2,985,934
SADDLE CLAMP
William L. Daubner, 258 High St., Hartford, Wis.
Filed Apr. 22, 1959, Ser. No. 808,247
6 Claims. (Cl. 24—277)

The invention relates to improvements in clamps and more particularly to a novel saddle clamp used to securely join telecoped tubular members together in a leakproof manner.

Known clamps of this general nature are unsatisfactory for a number of reasons all of which arise from inherent structural characteristics of such clamps. Such clamps are comprised of two essential parts, a semi-circular saddle portion and a U-bolt arranged to coact with the saddle portion and receive washers and bolts on its threaded ends for drawing the two parts together about the assembly to be joined thereby. A common type of saddle portion has holes or circular receptacles on its radially extending end portions, or wings, to receive the legs of the U-bolt. When such an assembly is drawn up tightly about the tubular structure, such as a muffler and tail pipe assembly, said structure is subjected to compressive force at two diametrically opposed segmental areas and as a consequence assumes an elliptical shape which permits leakage to occur in the region of the areas not compressed by the clamp. More particularly, the tubular structure is compressed in the regions underlying the central area of the opposed saddle and bolt portions and expands in the regions adjacent to the side areas over which the legs of the U-bolt lie.

There is no known means present in known types of saddle clamps for creating substantially uniform compressive force over the entire 360° of the tubular structure on which such clamps are mounted. This arises primarily because of the absence of any means to cause or to enable the legs of the U-bolt to move inwardly radially of the tubular structure and thereby wrap the clamp tightly about the assembly. In all known types of clamps the force created upon tightening the nuts on the bolt legs is in the direction of the axis of said legs which are substantially parallel and consequently exert clamping compression in diametrically opposed directions only. Such clamping results in the drawing away or bulging of the non-compressed side areas of the outer tubular member from the inner tubular member thus leaving gaps in said areas and creating an imperfect seal.

The clamp disclosed herein has its saddle fabricated from strap metal formed substantially U-haped and with semi-circular receptacles for the legs of the U-bolt. These receptacles are in direct communication with openings in the body of the saddle strap which allows the U-bolt legs to move inwardly toward one another when the nuts thereon are tightened. This draws or wraps the U-bolt into conformity with the curvature of the tubular structure being clamped and silimilarly pulls the receptacles inwardly toward one another thus drawing the U-shape saddle strap into conformity with said curvature. This reduces the diameter of the clamp assembly and results in the application of substantially uniform compressive forces around the entire circumfernce of the tubular structure.

The overall effect of the application of uniform compressive forces over the entire area of the tubular structure is to direct all pressure radially toward the axial center of the tubular structure and thereby reduces the diameter of the tubular structure underlying the clamp in direct proportion to the amount of force applied by tightening the nuts.

The provision in the saddle strap of openings in direct communication with the bolt leg receptacles enables the nuts to enter into said openings as they approach final tightening without impeding the inward converging movement of the bolt legs. Also, said bolts ultimately are brought into direct biting engagement with the outside surface of the outer tubular member thus eliminating the need for conventional lock washers.

Another feature of the disclosed structure is that the U-bolt and saddle strap may be easily assembled by threading one leg of the U-bolt through the opening adjacent to one receptacle and carrying said leg across to and through the opposed opening. Such pre-assembly is effected in instance where the clamp is fitted over one of the telescoped tubes before the tubes are telescoped and, if desired, a head may be formed on the end of one leg thus eliminating one nut from the assembly.

The structure by means of which the above noted and other advantages of the invention are attained will be described in the following specification, taken in conjunction with the accompanying drawings, showing a preferred illustrative embodiment of the invention, in which;

Fig. 1 is a side elevation view of a clamp embodying the invention, shown applied to two telescoped tubes.

Fig. 2 is a bottom view of the assembly shown in Fig. 1.

Fig. 3 is a sectional view taken on line 3—3 of Fig. 1.

Fig. 4 is a view like Fig. 3 but showing the clamp before it is tightened in place.

Fig. 5 is a bottom plan view of the saddle strap.

Fig. 6 is an enlarged sectional detail view taken on line 6—6 of Fig. 3.

Fig. 7 is an enlarged fragmentary detail sectional view taken substantially on line 7—7 of Fig. 1, showing the U-bolt in elevation.

Fig. 8 is a fragmentary detail sectional view similar to Fig. 7, but showing the clamp prior to being tightened.

Fig. 9 is a plan view of the blank from which the saddle strap is formed.

Fig. 10 is a perspective view of a modified form of U-bolt.

Fig. 11 is a perspective view of another form of U-bolt.

Referring to the accompanying drawings, the improved clamp comprises a U-bolt 11 and a complemental saddle strap 12 adapted, when assembled, to embrace a pair of telescoped tubes 13 and 14 for clamping said tubes together in a leak proof joint. The U-bolt 11 may be substantially conventional and it includes a substantially semi-circular bight portion 15 and extended legs 16 that are externally threaded at their ends, as at 17. The legs 16 normally are substantially parallel to each other.

The saddle strap 12 preferable is fabricated from strap steel stock initially formed into a blank 18 illustrated in Fig. 9. As shown, the blank is substantially rectangular in outline and formed with a substantially rectangular central opening 19 that has its longitudinal edges flared outwardly at their ends, as at 21. Blank 18 is then formed by means of any suitable die mechanism substantially U-shape longitudinally and the medial end areas 22, generally defined by dot-dash lines 23 are struck out of the plane of the blank to provide substantially U-shape bolt leg receiving receptacles 24 that open into the respective strap openings 25 (Fig. 5) formed by the presence of flared edges 21 of the blank opening 19. Forming of receptacles 24 carries the connecting side portions 26 of blank 18 toward one another so as to leave a slight gap 19a in the formed saddle strap. This manner of forming saddle strap 12 is inexpensive and it provides a structure especially adapted for use in a manner to insure clamping of the nature herein recited.

The U-shape saddle strap 12 preferably has a depth but slightly less than one half the outside diameter of outer telescoped tube 14 so that when initially fitted over said tube, as shown in Figs. 4 and 8, the upper edges 27 of bolt leg receptacles 24 will lie in a plane below the horizontal diameter of the assembly represented by dot-dash line 28, although it may be otherwise. The U-bolt 11, if not previously assembled with the saddle strap, then is seated over the top of the outer telescoped tube 14 with its legs 16 extended through receptacles 24. Nuts 29 then are threaded one on the projecting end of each leg 16. For reasons to become apparent presently, it is preferred to use nuts that are of greater length than conventional nuts of like gauge.

It should be noted that the other or lower edges or ends 31 of bolt receptacles 24 are inclined slightly inwardly-upwardly by reason of the forming of said receptacles. When nuts 29 are drawn up initially they bear against said inclined ends and, because of their presence and because of the open side of the receptacles in the area of openings 25, said nuts tend to and do move inwardly toward the tubular assembly carrying with them the engaged bolt legs 16. When they are fully tightened, as best shown in Fig. 7, bolt legs 16 have been drawn inwardly toward one another to cause the bolt to be wrapped tightly about the underlying tubular assembly. The saddle strap likewise is drawn up tightly against the tubular assembly and its end portions are similarly carried inwardly toward one another because of the compressive force exerted on the lower ends of receptacles 24. There is thus exerted a compressive force inwardly radially throughout the entire circumference of the tubular assembly, as indicated by arrows 32. This application of compressive force continues so long as the nuts are being tightened and when finally drawn up both tubes 13—14 of the tubular assembly are in tight face to face relationship throughout their entire circumference and are in fact offset inwardly under the clamp assembly as best indicated in Fig. 6. Also, nuts 29 are by this time carried into biting engagement with the outer surface of outside tube 14 and are held against backing off by reason of said engagement as well as because of the tension exerted by the receptacle which have been carried slightly beyond the horizontal diameter 28 of the tubular assembly as best shown in Fig. 7. There is no crimping of the tubular members and because of the uniform application of compressive force over their entire circumferences neither or them is rendered elliptical. Owing to the use of elongated nuts 29, a sufficient amount of said nuts is exposed beneath the saddle strap to permit use of conventional socket wrenches.

Fig. 10 illustrates a U-bolt 33 having a head 34 on the end of one of its legs 16a and screw threads on its other leg to receive a tightening nut. This type of U-bolt can be threaded easily and quickly into the bolt leg receptacle of the saddle strap.

Fig. 11 illustrates a U-bolt 35 having a flattened bight portion 36 thus adapting it to maximum wrapping around the tubular assembly.

Although I have described a preferred embodiment of my invention in considerable detail, it will be understood that the description thereof is intended to be illustrative, rather than restrictive, as many details of the structure shown may be modified or changed without departing from the spirit or scope of the invention. Accordingly, I do not desire to be restricted to the exact construction described.

I claim:
1. A clamp for sealing telescoped metal tubes to each other, said clamp comprising a U-shape saddle strap having parallel semi-circular body portions and connecting end portions, said end portions comprising tangentially elongated U-shape bolt leg receptacles with the open side of said receptacles facing each other, a U-bolt having a semi-circular portion and a pair of tangential legs extending through the receptacles, the radii of the semi-circular portions being substantially the same as the outside radius of the outer of said tubes, and nuts threaded on the ends of said legs and bearing against the ends of the related receptacles for wrapping said U-bolt and saddle strap tightly around said tubes, said saddle strap having a clearance opening between the body portions in communication with the open sides of the receptacles to admit the nuts thereinto and into biting engagement with the outer of said tubes.

2. A clamp for sealing telescoped metal tubes to each other, said clamp comprising a U-shape longitudinally split saddle strap having elongated U-shape bolt leg receptacles on its ends with the open side of said receptacles in communication with the longitudinal split, a U-bolt having a semi-circular portion and a pair of spaced tangential legs extending through the receptacles, the radii of the saddle strap and of said semi-circular portion of bolt being substantially the same as the outside radius of the outer of said tubes, and clamping nuts threaded on the ends of said legs and bearing against the ends of the receptacles for drawing said U-bolt and saddle strap tightly around said tubes, the longitudinal split in said saddle strap having widened end portions merging with the open sides of the receptacles to admit the nuts thereinto and into biting engagement with the outer of said tubes.

3. A clamp for sealing telescoped metal tubes to each other, said clamp comprising a U-shape saddle strap having elongated U-shape bolt leg receptacles on its ends with the open sides of said receptacles facing each other, a U-bolt having a semi-circular portion and a pair of spaced tangential legs extending through the receptacles, the radii of the saddle strap and of said semi-circular portion of the bolt being substantially the same as the outside radius of the outer of said tubes, and clamping nuts threaded on the ends of said legs and bearing against the ends of the receptacles for clamping said U-bolt and saddle strap around said tubes, said saddle strap having clearance openings, one in communication with the open side of each receptacle to admit the nuts thereinto and into biting engagement with the outer of said tubes.

4. A clamp for sealing telescoped metal tubes to each other, said clamp comprising a saddle strap having a semi-circular body and elongated tangential U-shape bolt leg receptacles on its ends with the open side of said receptaclees facing each other, a U-bolt having a semi-circular portion and a pair of spaced tangential legs extending through the receptacles, the radii of the semi-circular portions being substantially the same as the outside radius of the outer of said tubes, and nuts threaded on the ends of said legs and bearing against the opposed end of the respective receptacles for wrapping said U-bolt and saddle strap around said tubes, said saddle strap having clearance openings, one in communication with the open side of each receptacle to admit the nuts thereinto and into biting engagement with the outer of said tubes.

5. A saddle clamp strap fabricated from a substantially rectangular blank having a substantially rectangular opening therein defining spaced side portions and connecting end portions, said portions being curved longitudinally to provide a semi-circular body portion and the end portions formed substantially U-shape to provide tangential bolt receiving receptacles one on each end of the body portion, said receptacles having their open sides disposed inwardly toward each other.

6. A saddle clamp strap fabricated from a substantially rectangular blank having a substantially rectangular opening therein defining spaced side portions and connecting end portions, said side portions being curved longitudinally to provide a semi-circular body portion and the end portions formed substantially U-shape to provide tangential bolt receiving receptacles one on each end of the body portion, said receptacles having their open sides disposed inwardly toward each other and in direct communication with the space between said side portions.

References Cited in the file of this patent

UNITED STATES PATENTS

| | | |
|---|---|---|
| 1,792,221 | Hansen | Feb. 10, 1931 |
| 2,141,719 | Lyon | Dec. 27, 1938 |
| 2,705,121 | Kaminky et al. | Mar. 29, 1955 |
| 2,719,345 | Riker | Oct. 4, 1955 |
| 2,833,031 | Flumerfelt | May 6, 1958 |

FOREIGN PATENTS

| | | |
|---|---|---|
| 621,632 | France | Feb. 7, 1927 |